United States Patent
Borman et al.

(10) Patent No.: US 8,588,472 B2
(45) Date of Patent: Nov. 19, 2013

(54) METHOD AND SYSTEM FOR CHARACTERIZING MOVEMENT OF AN OBJECT

(75) Inventors: Gilbert A. Borman, Bloomfield Hills, MI (US); George R. Grenley, Pleasanton, CA (US); Richard E. Cobb, San Francisco, CA (US); Mark C. Lahti, Beverly Hills, MI (US)

(73) Assignee: Trigonimagery LLC, Ferndale, MI (US)

( * ) Notice: Subject to any disclaimer, the term of this patent is extended or adjusted under 35 U.S.C. 154(b) by 412 days.

(21) Appl. No.: 12/530,548

(22) PCT Filed: Mar. 10, 2008

(86) PCT No.: PCT/US2008/056373
§ 371 (c)(1),
(2), (4) Date: Sep. 9, 2009

(87) PCT Pub. No.: WO2008/112617
PCT Pub. Date: Sep. 18, 2008

(65) Prior Publication Data
US 2010/0092043 A1 Apr. 15, 2010

Related U.S. Application Data

(60) Provisional application No. 60/894,029, filed on Mar. 9, 2007.

(51) Int. Cl.
*G06K 9/00* (2006.01)
*G06K 9/46* (2006.01)
*G06K 9/62* (2006.01)

(52) U.S. Cl.
USPC .............................. 382/107; 382/190; 382/224

(58) Field of Classification Search
USPC .............................. 382/107, 190, 224; 706/20
See application file for complete search history.

(56) References Cited

U.S. PATENT DOCUMENTS

| | | | | |
|---|---|---|---|---|
| 5,717,792 A | * | 2/1998 | Poggio et al. | 382/278 |
| 5,946,419 A | * | 8/1999 | Chen et al. | 382/243 |
| 6,072,903 A | * | 6/2000 | Maki et al. | 382/190 |
| 6,778,180 B2 | | 8/2004 | Howard et al. | |
| 7,043,465 B2 | * | 5/2006 | Pirim | 706/20 |
| 2007/0122040 A1 | * | 5/2007 | Au et al. | 382/224 |

OTHER PUBLICATIONS

International Search Report and Written Opinion of the International Searching Authority, dated Aug. 6, 2008 for International Application No. PCT/US 08/56373 filed Mar. 10, 2008, 7 pgs.

* cited by examiner

*Primary Examiner* — Amara Abdi
(74) *Attorney, Agent, or Firm* — Brooks Kushman P.C.

(57) ABSTRACT

Motion of an object is characterized based on data indicative of a plurality of pixilated images of the object. An outline of the object may be extracted from the data for each pixilated image of the object. Changes over time in a shape and/or position of the outline may be used to determine a speed associated with the object.

23 Claims, 3 Drawing Sheets

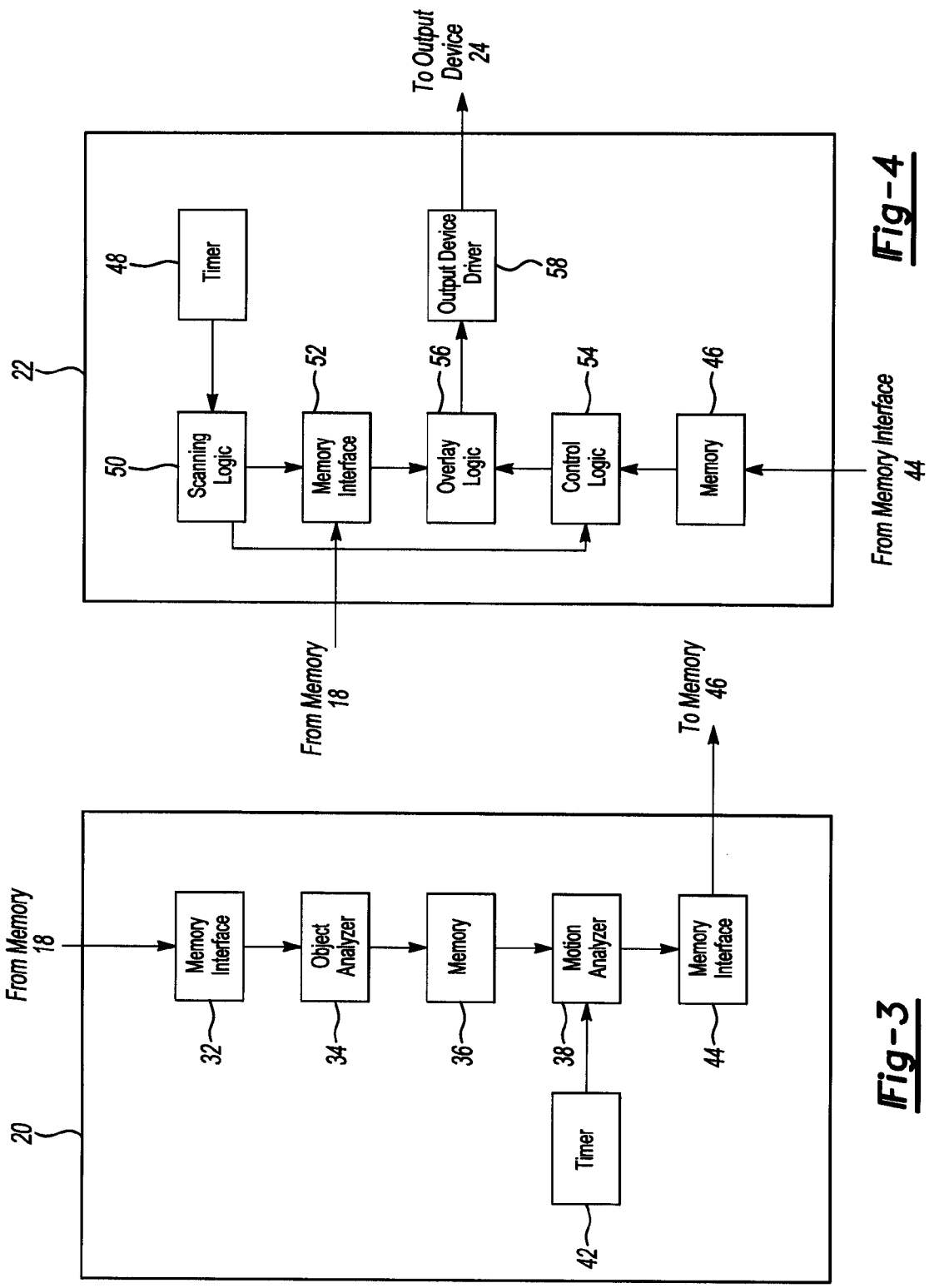

METHOD AND SYSTEM FOR CHARACTERIZING MOVEMENT OF AN OBJECT

CROSS-REFERENCE TO RELATED APPLICATIONS

This application is the National Stage of International Application No. PCT/US2008/056373, filed Mar. 10, 2008, which claims the benefit of Provisional Application No. 60/894,029, filed Mar. 9, 2007.

BACKGROUND

1. Field of the Invention

The invention relates to methods and systems for charactering movement of objects.

2. Discussion

Several techniques are known for determining a speed of a moving object: (a) Direct, active measurement, in which an electro-magnetic field, e.g, radio, infra-red, visible-light, or an acoustic field, e.g., ultrasonic, is directed generally at an object to be measured. Reflected energy is then analyzed to determine the speed of and/or the distance to the object. Examples of such systems implementing direct, active measurement include radar and lidar. (b) Mechanical measurement, in which an arrangement of detectors is placed such that a moving object triggers the detectors, and the time difference between the trigger events is used to calculate speed. The detectors may be, for example, beams of light or mechanical switches. (c) Focus analysis, in which an electronically-sensed image is analyzed for correct focus, that is, correct setting of the image-forming lens between the object and the image-sensing element. Such analysis, e.g., image contrast enhancement, parallax analysis, yields a distance to an object. Computing the change in focus-distance permits the computation of a component of speed of the object.

SUMMARY

A method for characterizing movement of an object having at least one feature includes identifying data indicative of a plurality of pixels defining an apparent shape and apparent size of the at least one feature from data indicative of a pixilated image of the object, and classifying the at least one feature into one of a plurality of predetermined feature classes based on the apparent shape of the at least one feature. The method also includes estimating an actual size of the at least one feature based on the classification, and determining a parameter indicative of the movement of the object based on the estimated actual size of the at least one feature, the apparent size of the at least one feature and a change in the apparent size of the at least one feature.

A system for analyzing movement of an object having at least one feature includes a processing unit. The processing unit is configured to receive a plurality of pixilated images of the object, extract an outline of the at least one feature from each of the plurality of pixilated images of the object, and determine an apparent position of the at least one feature within each of the plurality of pixilated images of the object. The processing unit is also configured to determine an apparent size of the at least one feature for each of the plurality of pixilated images of the object, estimate an actual size of the at least one feature based on at least one of the outlines, and determine a parameter indicative of the movement of the object based on the estimated actual size of the at least one feature, the apparent sizes of the at least one feature, and at least one of (i) the outlines of the at least one feature and (ii) the apparent positions of the at least one feature.

A system for analyzing movement of an object includes a processing unit. The processing unit is configured to receive image input indicative of a plurality of pixilated images of the object and size input indicative of an estimated size of the object. The processing unit is also configured to determine a speed of the object based on the image and size inputs, and provide output indicative of the determined speed of the object.

While exemplary embodiments in accordance with the invention are illustrated and disclosed, such disclosure should not be construed to limit the invention. It is anticipated that various modifications and alternative designs may be made without departing from the scope of the invention.

BRIEF DESCRIPTION OF THE DRAWINGS

FIG. 3 is a block diagram of a calculating logic module according to an embodiment of the invention.

FIG. 4 is a block diagram of a display and overlay logic module according to an embodiment of the invention.

DETAILED DESCRIPTION

Known techniques for determining a speed of a moving object present several issues. For example, direct, active measurement techniques are detectable. Third parties may detect the presence of an electro-magnetic or acoustic field. Mechanical measurement techniques require that the path of the object be known in advance so that detectors may be positioned in that path. These detectors may be susceptible to environmental interference. Focus analysis techniques are ineffective in low-light conditions and cannot concurrently calculate speeds for multiple objects: a lens can be optimally focused to only one distance. Additionally, the above techniques must be performed while the object is moving, not after the fact.

Certain embodiments of the invention characterize the motion of moving objects. This characterization may be based on a digital or film recording of the moving objects, rather than on the moving objects themselves. No additional light or other field source is necessary. As such, these embodiments may be undetectable in use.

Frames in a sequence of images may be analyzed to isolate objects from their environment. Frame to frame movements of identified objects are tracked to determine, for example, a speed associated with each of the identified objects. This information may be displayed with images of the objects. For example, speed information may be overlaid on or displayed next to its associated object. Speed information may also be displayed on a separate device.

Figure 1:
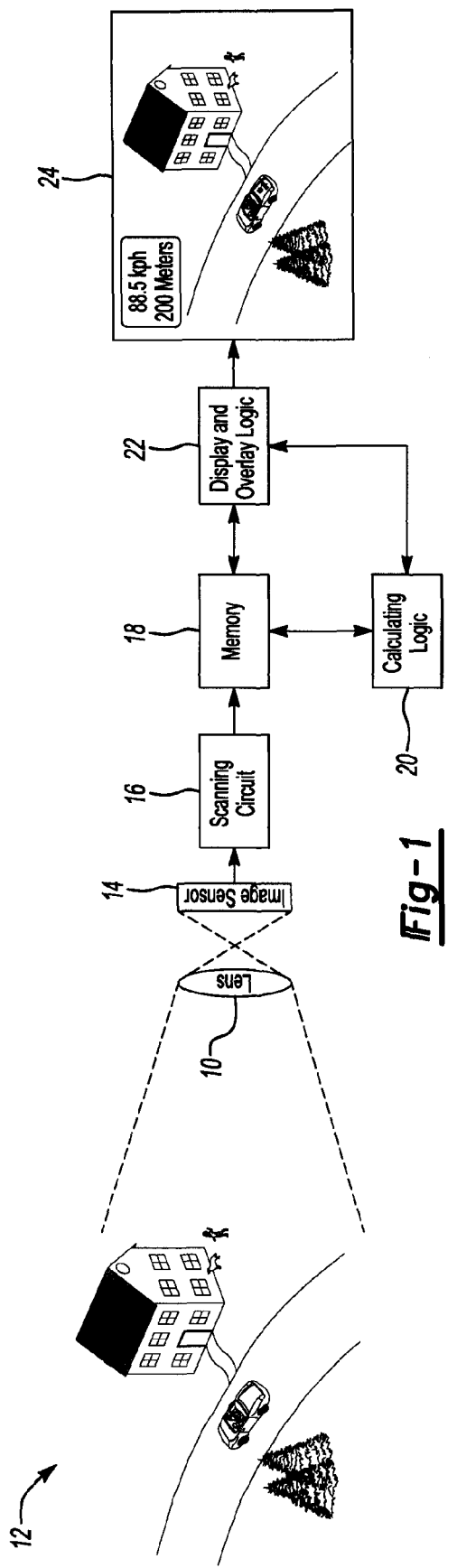
FIG. 1 is a block diagram of a motion analysis system according to an embodiment of the invention.

Referring now to FIG. 1, a lens 10 projects an image of an environment 12 onto an electronic image sensor 14. CMOS or CCD image sensors may be used. Of course, other suitable image sensors, such as image orthicons, may also be used. This image is scanned by an electronic scanning circuit 16 and stored in an electronic data storage 18, e.g., memory. Commercially available electronic scanning circuits capable of scanning and analog-to-digital conversion may be used. Suitable custom circuits, however, may also be used. The memory may be static random access memory, dynamic random access memory or any other suitable type of digital memory.

A calculating logic module 20 analyzes the image elements stored in the memory 18 and characterizes the movement of selected image elements. As discussed below, the calculating logic module 20 identifies regions of pixels which are moving relative to the overall image and analyzes these regions to classify them as geometric shapes, e.g., circle, square, etc., and/or real-world objects, e.g. face, car, etc.

The calculating logic module 20 may be a microprocessor or digital signal processor with suitable algorithms in firmware or software. A dedicated computational logic block, however, may also be used to provide increased speed if necessary.

As discussed below, information from the calculating logic module 20 is delivered to a display and overlay logic module 22 where it is combined with image data from the memory 18 and displayed on an output device 24.

Similar to the calculating logic module 20, the display and overlay logic module 22 may be a microprocessor or digital signal processor with suitable algorithms in firmware. Other implementations and configurations are also possible.

Figure 2:
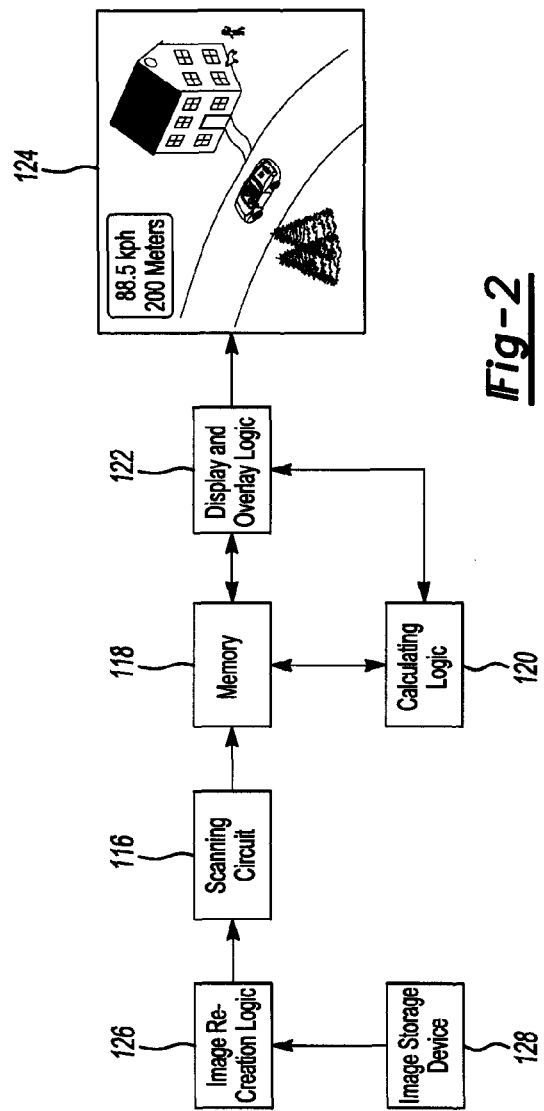
FIG. 2 is a block diagram of another motion analysis system according to another embodiment of the invention.

Referring now to FIG. 2, an image storage device 128 is accessed by an image re-creation logic module 126 to deliver a sequence of images to an electronic scanning circuit 116. Such images are scanned by the electronic scanning circuit 116 and stored in a memory 118. (Numbered elements of FIG. 2 that differ by 100 relative to numbered elements of FIG. 1 have similar, although not necessarily identical, descriptions to the numbered elements of FIG. 1.)

As discussed with reference to FIG. 1, a calculating logic module 120 analyzes the image elements stored in the memory 118 and characterizes the movement of selected image elements. Information from the calculating logic module 120 is delivered to a display and overlay logic module 122 where it is combined with image data from the memory 118 and displayed on an output device 124.

Referring now to FIG. 3, a memory interface 32 retrieves stored image information from the memory 18. Each image is a "sea of pixels" and does not directly contain any information about objects or portions of objects within the image captured. An object analyzer 34, therefore, identifies objects (or portions of objects) within the image and determines if they are moving.

The object analyzer 34 examines each image and extracts outlines from the background, noting the apparent size and position of these outlines within each image. These outlines may be of a portion of an object, e.g., a wheel of a vehicle, a nose of a face, a seam of a baseball, etc., or may be of an entire object, e.g., a baseball. The apparent size and position of the outlines is represented as a database schema containing mathematical coefficients which represent abstracted geometric properties of the object. In other embodiments, however, any suitable representation scheme may be used.

The object analyzer 34 of FIG. 3 extracts this information via edge analysis techniques. Any suitable technique, such as the object-identification or motion-estimation algorithms used in H.264 or MPEG-4 image compression, may also be used. An image is analyzed and "edge" pixels are marked. Adjacent pixels are compared to determine if there is a substantial difference in color or brightness. If so, such a difference may define an edge. All "edge" pixels are then analyzed to determine if they are adjacent to other "edge" pixels. Those that are not are discarded. The remaining "edge" pixels represent lines. These lines may be straight or curved and may be open or closed. The lines are analyzed to find their endpoints. If no endpoints are found, or if the endpoints are close together, the line is considered an outline.

Outlines are compared with a database of known outlines corresponding to known objects stored in a memory using any suitable image recognition technique, e.g., neural network, heuristic, etc. For example, a comparison of an extracted outline with the database of known outlines may reveal that the extracted outline is a tire of a bicycle. The database further includes dimensions associated with each of the known objects. An actual size of the object may thus be estimated based on its classification relative to the known objects. For example, the extracted outline identified as a bicycle tire may be assigned an estimated actual diameter of 30 inches.

An actual distance from a viewing device to the object may be calculated based on the apparent size of the outline and the estimated actual size of the object. For example, a baseball is known to have a diameter, D, of 2.866 inches. The apparent angular width, A, of the baseball is known from the image. (It is the portion of the full width of the image.) From trigonometry, $$\text{Tangent}\ \frac{A}{2} = \frac{D}{2} \Big/ d$$

where d is the distance to the baseball. As explained below, this information may be used to determine whether the object is moving.

In other embodiments, focus information from, for example, a camera's auto-focus may be incorporated into the algorithms used by the motion analyzer 34 to assist in determining the distance to an object whose exact size is not known. The use of this focus information may improve the accuracy of speed calculations compared to circumstances where an approximate size of the object is merely assumed.

An extracted outline may also be classified into one of several geometric categories, e.g., square, rectangle, circle, ellipse, trapezoid, etc., using, for example, any suitable curve-fitting technique. The data corresponding to pixels of an outline are "fit" to an equation associated with each category. A fit coefficient is then calculated. The object outline is classified by whichever category yields the best fit coefficient and stored in an object list for that image in the memory 36. As discussed below, this information may be used to determine whether the object is moving.

In the embodiment of FIG. 3, the above analysis is performed for each frame of data. Each new object list is compared to the previous object list. Outlines that, from frame to frame, change position, size and/or geometric classification are considered moving objects. The object analyzer 34 stores a list of all such objects in the memory 36.

The output data structure from the object analyzer 34 is typically expressed in units of pixels and may include information indicative of an outline's location and size. A motion analyzer 38 examines the data structure(s) stored in the memory 36 to determine movements associated with an object.

Analyzing frame to frame changes associated with an object's outline yields real-world information about movements of the object associated with the outline. In the embodiment of FIG. 3, the motion analyzer 38 captures such information via data structures. In one example, the motion-estimation algorithm used by the motion analyzer 38 creates a data structure which identifies, in Cartesian coordinates, a current position and size of an outline and a future position and size of the outline. In another example, the motion-estimation algorithm used by the motion analyzer 38 creates a data structure which identifies an initial location, size and velocity for the outline. Any suitable data structure, however, may be used.

Changes in outline size and/or position are indicative of object movement. For example, an object outline that is increasing in size indicates that the object is moving towards the viewer. Changes in geometric classification are indicative of rotation. For example, a change in classification from rectangle to square indicates the object is rotating relative to the viewer. Of course, an object may translate and rotate. Such translation and rotation may be evident from an object outline that is changing in size and/or position and changing in geometric classification.

In the embodiment of FIG. 3, the motion analyzer characterizes the motion associated with objects by analyzing frame to frame differences of outlines. Changes in apparent size of an outline may be used to determine movement away from or toward the viewer. For example, if an object is determined to be 10 feet away in a first frame of the image and 12 feet away in a second frame of the image, the object has moved 2 feet away from the viewer. Dividing this distance by the time between the two frames, as provided by a timer 42, e.g., a crystal-controlled digital timer typically included in microprocessor systems, will yield a component of speed, $Speed_{toward/away}$, associated with the object.

Changes in apparent position of an outline may be used to determine movement cross-wise to the viewer. For example, if an outline is located at position (0, 0) in a first frame of the image and at position (0, 1) in a second frame of the image, the outline has moved 1 unit to the right of the viewer. The estimated actual size of the object and apparent change in position of its associated outline may be used to determine an actual distance traveled to the right of the viewer. Using the baseball example, the image's movement can be computed in terms of its own size, e.g., the baseball has moved 2.4 diameters across the field of view. Therefore, it has moved 2.4× 2.866 inches. Dividing this distance by the time between the two frames, as provided by the timer 42, will yield another component of speed, $Speed_{cross-wise}$, associated with the object.

In the embodiment of FIG. 3, the timer 42 determines the time between the two frames by multiplying the known time between two consecutive frames by the number of frames between the two instances captured. (US television/video is at 29.997 frames per second. The reciprocal of this value is the frame time. EU television/video is at 25 frames per second. Modern film is at 24 frames per second.) In other embodiments, however, other techniques may also be used.

The above components of speed may be resolved into a resultant speed for the object using, for example, the following relation $$\text{Resultant Speed} = \sqrt{(Speed_{toward/away})^2 + (Speed_{cross-wise})^2}.$$

Other approaches are also possible. For example, the distance toward/away from the viewer as well as the distance traveled cross-wise to the viewer may be resolved into a resultant distance traveled using calculations similar to the above. This resultant distance may then be divided by the time between the two frames to determine the resultant speed. Of course, other types of movement such as those including rotation, may require more complex calculations. These calculations, however, may be performed using any suitable technique.

The functions of the calculating logic module 20 may be implemented in a variety of ways. For example, certain embodiments of the calculating logic module 20 identify regions of pixels which are moving, and recognize regions of pixels as real objects, e.g., a face or a car. The order in which these tasks are performed may vary depending on the implementation. In other words, it would be possible to first identify as many real objects (faces, cars, etc.) in the image as possible, and then assess their motion, or first asses moving regions, and then identify them. It is, of course, also possible to perform both tasks in parallel.

In some circumstances, a camera may itself be moving. Certain embodiments are able to detect this motion, compute the camera's speed, and use this to correct other speeds. For example, after the motion analyzer 38 has determined the motion of multiple objects in the image, it performs an analysis of motion common to all (or most) objects. If most objects are moving from right to left, the camera is moving from left to right. If most objects are moving away from the image center toward all four edges, the camera is zooming in, or moving closer.

A memory interface 44 writes a data structure representing the object, e.g., position, speed, etc., into a memory 46 (FIG. 4). The memory interface 44 updates this data structure as often as new data requires. In the embodiment of FIG. 3, the memory interface 44 may be viewed as a specialized database, with a suitable schema designed to be highly efficient at representing object-recognition data.

Referring now to FIG. 4, a timer 48 drives a scanning logic module 50 to retrieve image information via a memory interface 52 from the memory 18. Timing pulses from the timer 48 drive a digital counter, which is used as the address to the memory 18 via the interface 52. The scanning logic module 50 sends a current scanning location to a control logic module 54, which compares it against the list of moving objects stored in the memory 46. (Note that in the embodiment of FIG. 4, the memory 46 is being updated regularly by the calculating logic module 20. This update includes, for example, a current location and speed of the object.)

The control logic module 54 searches the list of moving objects to see if any are located at the currently-scanned location. In the embodiment of FIG. 4, the search is based on Content-Addressable Memory, but other search methods may also be used. When the control logic module 54 detects a match, it notes the speed data stored in the memory 46, generates character forms, e.g., the numeral "55" and the letters "mph," and instructs an overlay logic module to overlay the speed information in that area of the image to be displayed. The overlay logic module 56 sends the combined information to the output device 24 via an output device driver 58, using any suitable technique appropriate to the type of output device 24 being used.

In the embodiment of FIG. 4, the basic overlay technique is similar to overlay functions already in use to insert picture-in-picture or overlay one video image in a small rectangle on another image. In other embodiments, however, any suitable display technique may be used.

Figure 5:
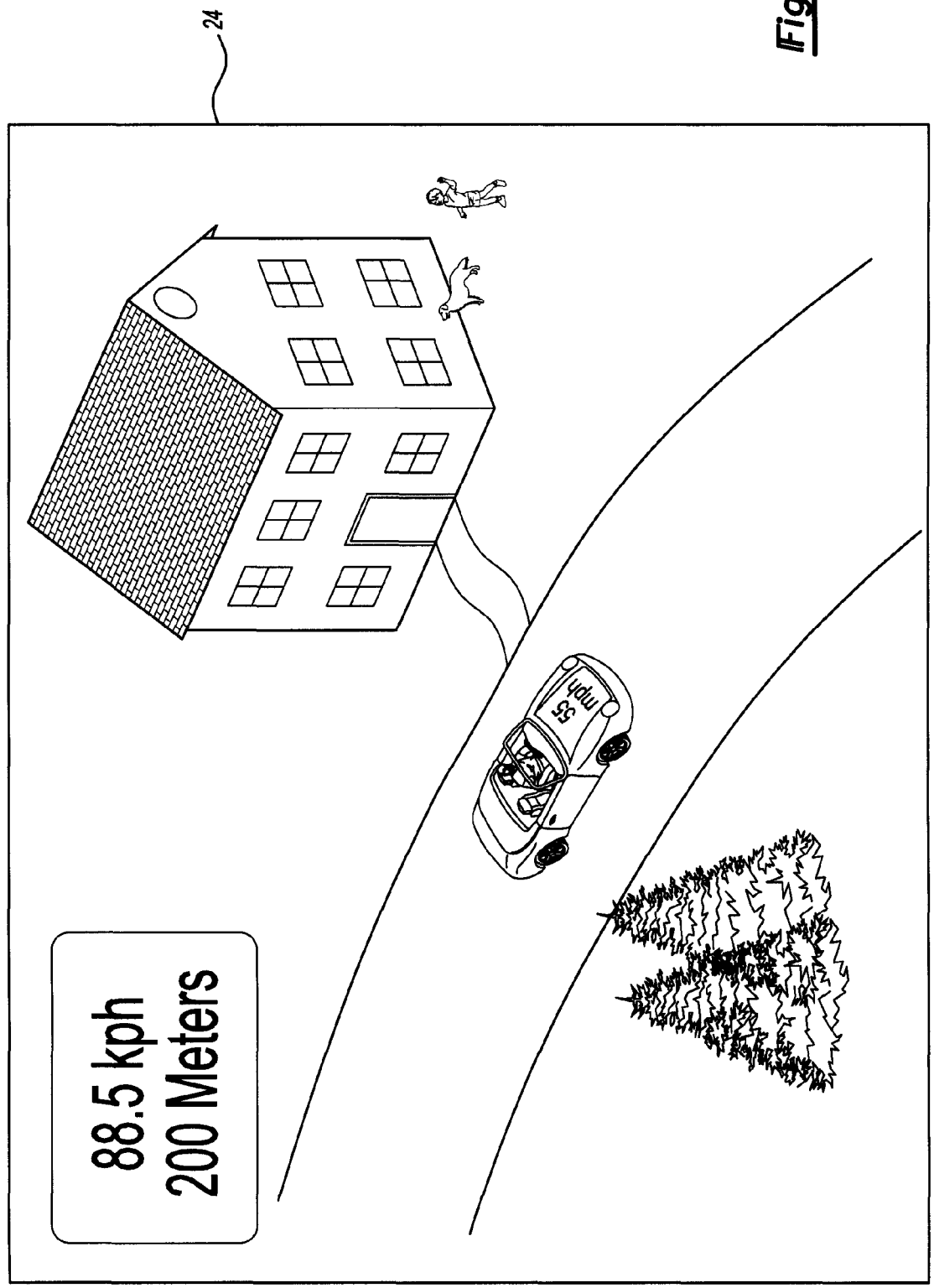
FIG. 5 is an enlarged view of an output device of FIG. 1.

Referring now to FIG. 5, the display device 24 displays static objects, such as the tree and house, without speed information but overlays speed information, e.g., "55 mph," on the moving object, i.e., the car. The display device 24 also displays the speed of the car in "kph" and the distance between the viewing device and the car, i.e., "200 meters." In other embodiments, however, such speed and other motion information may be displayed separate from the image of the object being analyzed.

One of ordinary skill will recognize that the techniques described herein may be implemented in a variety of configurations and circumstances. For example, a ballistic targeting system for military or sporting activities may estimate an expected location of a moving target based on its current location and determined velocity. A baseball game may be analyzed and broadcast with information about the trajectory, spin and velocity of the ball as it is thrown by a pitcher. The speed of on-coming traffic may be assessed in order to indicate when it is safe to turn along a path crossing such on-coming traffic.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for characterizing movement of an object having at least one feature, the method comprising:
   identifying data indicative of a plurality of pixels defining an apparent shape, apparent size and apparent position of the at least one feature from data indicative of a pixilated image of the object;
   classifying the at least one feature into one of a plurality of predetermined feature classes based on the apparent shape of the at least one feature;
   estimating an actual size of the at least one feature based on the classification; and
   determining a speed of the object based on the estimated actual size of the at least one feature, the apparent size of the at least one feature, a frame to frame change in the apparent size and the apparent position of the at least one feature, and a time between two frames.

2. The method of claim 1 wherein the data indicative of the plurality of pixels further defines an apparent position of the at least one feature and wherein the determined speed of the object is further based on a change in the apparent position of the at least one feature.

3. The method of claim 1 wherein the determined speed of the object is further based on a change in the apparent shape of the at least one feature.

4. The method of claim 1 further comprising displaying a representation of the determined speed with a pixilated image of the object.

5. The method of claim 1 further comprising determining whether the object is moving.

6. The method of claim 1 wherein determining a speed of the object includes determining whether the object is rotating.

7. The method of claim 1 wherein the at least one feature comprises an outline of the object.

8. The method of claim 1 wherein the at least one feature comprises an outline of a portion of the object.

9. The method of claim 1 wherein classifying the at least one feature into one of a plurality of predetermined feature classes based on the apparent shape of the at least one feature includes comparing the apparent shape of the at least one feature with a plurality of shapes corresponding to the predetermined feature classes.

10. The method of claim 1 wherein the plurality of predetermined feature classes comprises a plurality of predetermined geometric shapes.

11. A non-transitory computer-readable storage medium having information stored thereon for directing a computer to perform the method of claim 1.

12. A system for characterizing movement of an object having at least one feature, the system comprising:
    a computing machine configured to
      receive input indicative of a pixilated image of the object,
      identify data indicative of a plurality of pixels defining an apparent shape, apparent size and apparent position of the at least one feature from the input indicative of the pixilated image of the object,
      classify the at least one feature into one of a plurality of predetermined feature classes based on the apparent shape of the at least one feature,
      estimate an actual size of the at least one feature based on the classification,
      determine a speed of the object based on the estimated actual size of the at least one feature, the apparent size of the at least one feature, a frame to frame change in the apparent size and the apparent position of the at least one feature, and a time between two frames, and
      provide output indicative of the determined speed.

13. The system of claim 12 wherein the data indicative of the plurality of pixels further defines an apparent position of the at least one feature and wherein the determined speed of the object is further based on a change in the apparent position of the at least one feature.

14. The system of claim 12 wherein the determined speed of the object is further based on a change in the apparent shape of the at least one feature.

15. The system of claim 12 wherein the computing machine is further configured to display a representation of the determined speed with a pixilated image of the object.

16. The system of claim 12 wherein the computing machine is further configured to determine whether the object is moving.

17. The system of claim 12 wherein determining a speed of the object includes determining whether the object is rotating.

18. The system of claim 12 wherein the at least one feature comprises an outline of the object.

19. The system of claim 12 wherein the at least one feature comprises an outline of a portion of the object.

20. The system of claim 12 wherein classifying the at least one feature into one of a plurality of predetermined feature classes based on the apparent shape of the at least one feature includes comparing the apparent shape of the at least one feature with a plurality of shapes corresponding to the predetermined feature classes.

21. The system of claim 12 wherein the plurality of predetermined feature classes comprises a plurality of predetermined geometric shapes.

22. A system for analyzing movement of an object having at least one feature, the system comprising:
    a processing unit configured to
      receive a plurality of pixilated images of the object,
      extract an outline of the at least one feature from each of the plurality of pixilated images of the object,
      determine an apparent position of the at least one feature within each of the plurality of pixilated images of the object,
      determine an apparent size of the at least one feature for each of the plurality of pixilated images of the object,
      estimate an actual size of the at least one feature based on at least one of the outlines, and
      determine a speed of the object based on the estimated actual size of the at least one feature, frame to frame changes in the apparent size of the at least one feature, at least one of (i) the outlines of the at least one feature or (ii) frame to frame changes in the apparent position of the at least one feature, and a time between two frames.

23. A system for analyzing movement of an object, the system comprising:
a processing unit configured to
receive image input indicative of a plurality of frames of pixilated images of the object and size input indicative of an estimated size of the object;
determine a speed of the object based on the size input, frame to frame changes in an apparent size and position of the image, and a time between two frames; and
provide output indicative of the determined speed of the object.

* * * * *